Figure 1:
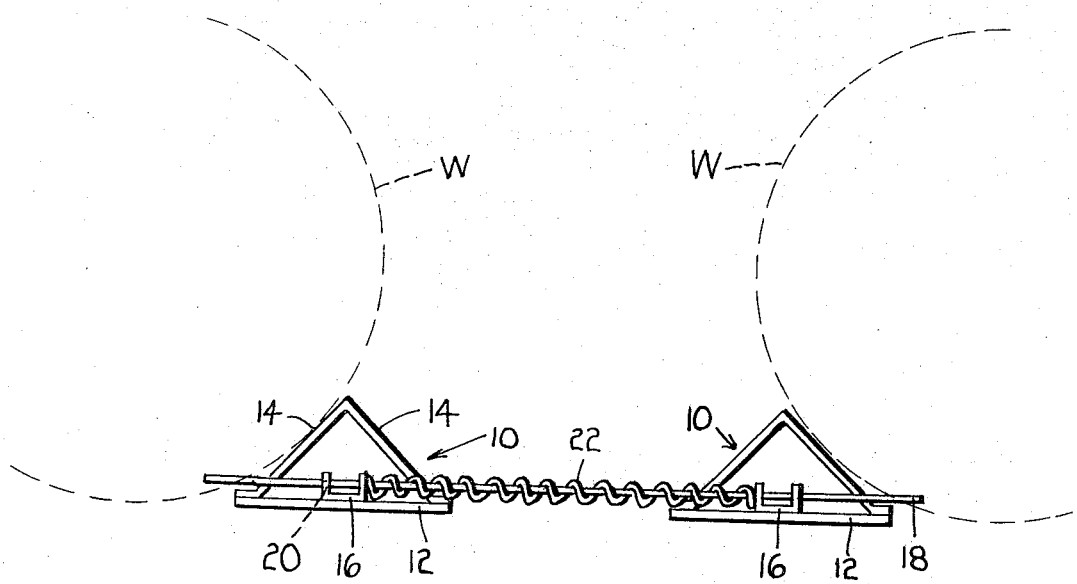
Figure 2:
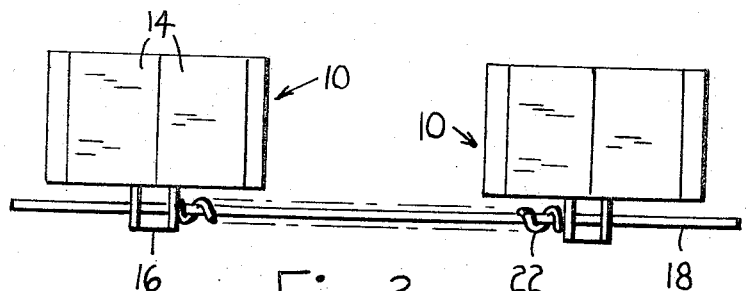
Figure 3:
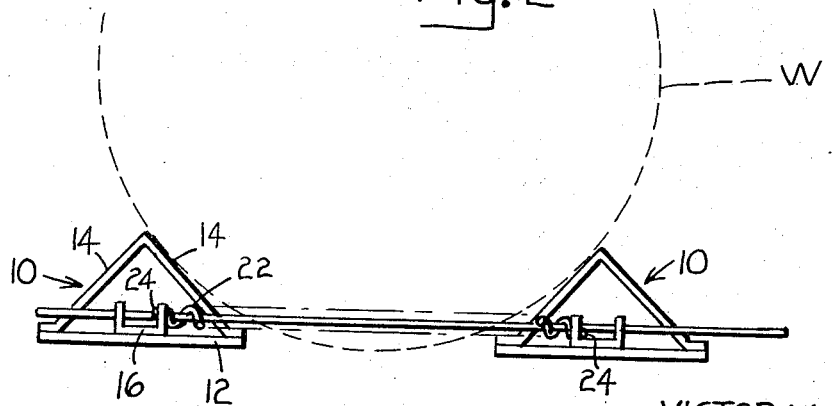

Aug. 29, 1967      V. W. LINDEEN      3,338,338

VEHICLE WHEEL BLOCKS

Filed Oct. 22, 1965

INVENTOR
VICTOR W. LINDEEN
BY Eugene M. Eckelman
ATTORNEY

United States Patent Office 3,338,338
Patented Aug. 29, 1967

3,338,338
VEHICLE WHEEL BLOCKS

Victor W. Lindeen, 970 W. 7th Ave.,
Eugene, Oreg. 97402

Filed Oct. 22, 1965, Ser. No. 501,270
1 Claim. (Cl. 188—32)

This invention relates to new and useful improvements in wheel blocks utilized to hold a vehicle in a stationary position.

The present invention is particularly useful for holding vehicles such as camp trailers, mobile homes, or any other type of wheeled vehicles in a stationary position when they are parked. To explain further, it is customary when parking a trailer, for example, to place blocks on both sides of at least some of the wheels to prevent it from rolling in either direction. Some trailers are provided with tandem wheels on each side thereof and some are provided with single wheels on each side. In any case, it is generally desirable that blocks be placed on opposite sides of one or more of the wheels to assure a stationary parked position of the vehicle.

It is accordingly a primary objective of the present invention to provide a vehicle wheel block structure having a novel construction and arrangement of parts for the engagement of one or more wheels to prevent the vehicle from rolling in either direction.

Another object is to provide a vehicle wheel block structure which by simple alteration may be used on a single wheel or on tandem wheels.

Still another object is to provide a vehicle wheel block structure which is simple in structure and inexpensive to manufacture.

Briefly stated, the invention comprises a pair of peaked wheel engaging blocks one or both of which is slidably connected to an elongated rod. Connected between the peaked portions and mounted on the rod is a spring which urges the blocks into wheel engaging positions. The spring comprises a tension spring or a compression spring depending upon the vehicle wheel arrangement with which the device is to be used.

The invention will be better understood and additional objects will become apparent from the following specification and claims considered together with the accompanying drawings, wherein the numerals of reference indicate like parts.

In the drawings:

FIGURE 1 is a side elevational view of the present vehicle wheel block structure and its engagement with tandem wheels;

FIGURE 2 is a top plan view of the structure; and

FIGURE 3 is a side elevational view of the structure in engagement with a single wheel.

Referring now in particular to the drawings, the present invention comprises a pair of wheel engaging blocks 10 having a horizontal base portion 12 and an upstanding, triangular wheel engaging portion 14. The triangular portion 14 is integrated with the base portion and preferably form with the base portion an isosceles triangle wherein both portions 14 extend at the same angle from the base. The blocks 10 are open at their ends and have a channel-shaped bracket 16 secured integrally to the upper surface of the base portion 12 in any suitable manner. As apparent in FIGURE 2, one end of each of the brackets 16 projects beyond the side of its respective base and such projecting ends slidably receive an elongated rod 18. Brackets 16 have suitable apertures 20 for slidably receiving the rod 18.

By means of the slidable connection of the blocks 10 with the rod 18, said blocks may be moved toward and away from each other on the rod for the purpose of spacing them selectively for engaging opposite wheel surfaces. It is clear that one of the blocks 10 may be secured in non-slidable relation at one end of the rod and the other may be slidable on the rod to accomplish the desired spacing of the blocks.

With reference to FIGURE 1, the present invention is shown in an operative position between a pair of tandem wheels W. In such tandem wheel arrangement the blocks are moved together sufficiently for inserting them between two adjacent wheels whereby opposed wheel surfaces are blocked and the vehicle cannot move in either direction. Where the vehicle has a single wheel on each side thereof the blocks are merely placed on opposite sides of one of the wheels W as shown in FIGURE 3.

It is desired that the blocks be held in engagement with the wheels by suitable spring means. With reference to the structure of FIGURE 1 wherein the device is utilized with tandem wheels, a compression spring 22 is utilized to urge the blocks apart. The spring 22 comprises a helical-type spring and is carried on the rod 18 to bear against opposed sides of the brackets 16 whereby to urge the blocks 10 apart. In the use of the device on a single wheel, a helical tension spring 24 is carried on the rod 18 and urges the blocks 10 together for engaging opposite sides of a single wheel. For this purpose, the ends 26 of the spring 24 are secured to the brackets 16 in any manner such as by hooked engagement in suitable apertures in the brackets.

Thus, the present invention comprises an extremely simplified wheel block structure which is inexpensive to manufacture and light in weight. Furthermore, by utilizing a selective type of spring operative on the block portions 10 the device may be used with tandem wheels or a single wheel respectively. In this latter regard, the arrangement may be such that the rod 18 may be slidably disengaged from at least one of the brackets 16, whereby the desired type of spring may be installed thereon. Thus, in retailing the product, the merchant may install the suitable spring as the need requires. The bracket would of course have means such as suitable apertures, to connect the ends of the tension spring thereto.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A device for blocking wheels of a vehicle for holding the vehicle in a stationary position, comprising a pair of block members, said block members having a base portion and an upstanding portion on each block member integrated with respective ones of said base portions, said upstanding portions each having a pair of opposed inclined wheel engaging faces, brackets integrated with each of said base portions and projecting beyond the sides thereof, rod means extending through the projecting ends of said brackets, said rod means being slidably engaged with at least one of said brackets for allowing varied spacing of said block members with relation to each other, spring means surrounding said rod means and arranged to urge the wheel engaging faces of said block members into wheel edge surfaces, and means on opposite ends of said spring means arranged to connect said spring means to said brackets, said rod means being detachable from at least one of said brackets and arranged upon detachment therefrom to receive either a compression spring or a tension spring as said spring means depending upon whether the block members are to be urged apart for engagement with opposed wheel edge surfaces of a pair of tandem wheels or to be urged together for engagement with opposite edge surfaces of a single wheel, said spring means when consisting of a compression spring being abutted at opposite ends thereof against said brackets and when consisting of a tension spring being connected by its opposite ends to said brackets.

References Cited
UNITED STATES PATENTS

| | | | |
|---|---|---|---|
| 1,407,338 | 2/1922 | Skiles | 188—32 |
| 2,455,953 | 12/1948 | Schultz | 188—32 |
| 2,719,610 | 10/1955 | Allison | 188—32 |
| 2,773,564 | 12/1956 | Garard | 188—32 |

MILTON BUCHLER, *Primary Examiner.*

BENJAMIN HERSH, *Examiner.*

B. S. MOWRY, *Assistant Examiner.*